(12) United States Patent
Zhou et al.

(10) Patent No.: US 11,134,195 B2
(45) Date of Patent: Sep. 28, 2021

(54) IMAGE SENSOR, CAMERA MODULE AND ELECTRONIC DEVICE

(71) Applicant: Guangdong Oppo Mobile Telecommunications Corp., Ltd., Guangdong (CN)

(72) Inventors: Yibao Zhou, Guangdong (CN); Jiao Cheng, Guangdong (CN); Haiping Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/603,769

(22) PCT Filed: Apr. 4, 2018

(86) PCT No.: PCT/CN2018/081829
§ 371 (c)(1),
(2) Date: Oct. 8, 2019

(87) PCT Pub. No.: WO2018/201843
PCT Pub. Date: Nov. 8, 2018

(65) Prior Publication Data
US 2020/0036894 A1    Jan. 30, 2020

(30) Foreign Application Priority Data
May 3, 2017   (CN) .......................... 201710307638.3

(51) Int. Cl.
*H04N 5/232*   (2006.01)
*H04N 5/225*   (2006.01)

(52) U.S. Cl.
CPC ....... *H04N 5/23245* (2013.01); *H04N 5/2258* (2013.01); *H04N 5/2254* (2013.01)

(58) Field of Classification Search
CPC .......... H04N 5/23258; H04N 5/23245; H04N 2209/045–2209/046; F21V 33/0052; H01L 27/14621; G02B 5/281–5/283
(Continued)

(56) References Cited

U.S. PATENT DOCUMENTS

| 4,937,611 A | 6/1990 | Miyazaki |
| 5,602,615 A | 2/1997 | Muramatsu et al. |

(Continued)

FOREIGN PATENT DOCUMENTS

| CN | 1669313 A | 9/2005 |
| CN | 101582985 A | 11/2009 |

(Continued)

OTHER PUBLICATIONS

ISR with English translation for PCT/CN2018/081829 dated Nov. 8, 2018.

(Continued)

*Primary Examiner* — Xi Wang
(74) *Attorney, Agent, or Firm* — Young Basile Hanlon & MacFarlane, P.C.

(57) ABSTRACT

An image sensor, a camera module, and an electronic device are provided. The image sensor includes a pixel array and a control circuit. The pixel array includes a plurality of row pixels and a plurality of column pixels. The control circuit is configured to receive a first instruction to control an intersection region of a part of the plurality of row pixels and a part of the plurality of column pixels to detect an illumination intensity. The control circuit is further configured to receive a second instruction to control at least part of the pixel array to acquire an image.

19 Claims, 7 Drawing Sheets

(58) Field of Classification Search
USPC ....... 348/273–283, 227.1, 294; 359/358–361
See application file for complete search history.

(56) References Cited

U.S. PATENT DOCUMENTS

| | | | | |
|---|---|---|---|---|
| 10,412,205 | B2* | 9/2019 | Cheng | H04N 5/3696 |
| 10,419,588 | B2* | 9/2019 | Zhou | H04N 5/2253 |
| 10,554,869 | B2* | 2/2020 | Zhou | G01J 1/4204 |
| 10,673,998 | B2* | 6/2020 | Cheng | G01J 1/4204 |
| 2003/0026608 | A1 | 2/2003 | Malloy Desormeaux | |
| 2006/0170811 | A1* | 8/2006 | Joung | H04N 5/2254 348/342 |
| 2008/0055424 | A1 | 3/2008 | Jerdev | |
| 2012/0100888 | A1 | 4/2012 | Kim | |
| 2012/0287331 | A1* | 11/2012 | Iwane | H04N 5/2254 348/360 |
| 2013/0187027 | A1 | 7/2013 | Qiao et al. | |
| 2013/0321687 | A1* | 12/2013 | Negroponte | H04N 5/23293 348/333.11 |
| 2014/0340553 | A1* | 11/2014 | Kuang | H04N 5/35563 348/302 |
| 2016/0119569 | A1 | 4/2016 | Chen et al. | |
| 2017/0187951 | A1* | 6/2017 | Aoki | H04N 5/36961 |
| 2017/0201749 | A1* | 7/2017 | Oishi | G06T 5/10 |
| 2017/0366754 | A1* | 12/2017 | Feng | H04N 5/378 |
| 2020/0045214 | A1* | 2/2020 | Zhou | H04N 5/2253 |

FOREIGN PATENT DOCUMENTS

| | | |
|---|---|---|
| CN | 102595030 A | 7/2012 |
| CN | 103501413 A | 1/2014 |
| CN | 103546675 A | 1/2014 |
| CN | 103634504 A | 3/2014 |
| CN | 103973983 A | 8/2014 |
| CN | 104054327 A | 9/2014 |
| CN | 104349033 A | 2/2015 |
| CN | 106200932 A | 12/2016 |
| CN | 106303273 A | 1/2017 |
| CN | 107135341 A | 9/2017 |
| EP | 0342708 A2 | 11/1989 |
| JP | S62203141 A | 9/1987 |
| JP | H02170780 A | 7/1990 |
| KR | 20120067050 A | 6/2012 |

OTHER PUBLICATIONS

OA with English translation for CN application 201710307638.3 dated Mar. 4, 2019.
Extended European Search Report for European Application No. 18793765.1 dated Feb. 28, 2020.
Communication pursuant to Article 94(3) EPC for EP application 18793765.1 dated Nov. 4, 2020.
India Office Action for IN Application 201917044289 dated Jan. 29, 2021. (6 pages).
Communication pursuant to Article 94(3) EPC for EP Application 18793765.1 dated Jun. 2, 2021. (7 pages).

* cited by examiner

IMAGE SENSOR, CAMERA MODULE AND ELECTRONIC DEVICE

CROSS-REFERENCE TO RELATED APPLICATION(S)

This application is a 371 application of International Application No. PCT/CN2018/081829, filed on Apr. 4, 2018, which claims priority to Chinese Patent Application No. 201710307638.3, filed on May 3, 2017, the entire content of both of which are incorporated herein by reference in their entireties.

TECHNICAL FIELD

The present disclosure relates to a field of electronic technology, and more particularly to an image sensor, a camera module and an electronic device.

BACKGROUND

Current mobile phones usually include a front camera for taking a selfie and a light sensor for sensing an ambient-light brightness so as to adjust a brightness of a display screen according to the ambient-light brightness. However, the front camera and the light sensor are separately arranged in most of the present mobile phones, which results in a small proportion of space available for arranging the display screen in the mobile phone, and hence causing a low screen-to-body ratio of the mobile phone.

SUMMARY

Embodiments of the present disclosure provide an image sensor, a camera module and an electronic device.

The image sensor according to embodiments of the present disclosure includes a pixel array and a control circuit. The pixel array includes a plurality of pixel rows and a plurality of pixel columns. The control circuit is configured to receive a first instruction to control an intersection region of a part of the plurality of pixel rows and a part of the plurality of pixel columns to detect a illumination intensity, and further to receive a second instruction to control at least part of the pixel array to acquire an image.

The camera module according to embodiments of the present disclosure includes an image sensor and an optical filter arranged above the image sensor. The image sensor includes a pixel array and a control circuit. The pixel array includes a plurality of pixel rows and a plurality of pixel columns. The control circuit is configured to receive a first instruction to control an intersection region of a part of the pixel rows and a part of the pixel columns to detect a illumination intensity, so as to control the image sensor to operate in a light sensing mode, and further to receive a second instruction to control the pixel array to acquire an image, so as to control the image sensor to operate in an imaging mode.

The electronic device according to embodiments of the present disclosure includes a camera module and a processor. The camera module includes an image sensor and an optical filter arranged above the image sensor. The image sensor includes a pixel array and a control circuit. The pixel array includes a plurality of pixel rows and a plurality of pixel columns. The control circuit is configured to receive a first instruction to control an intersection region of a part of the plurality of pixel rows and a part of the plurality of pixel columns to detect a illumination intensity, and further to receive a second instruction to control at least part of the pixel array to acquire an image. The processor is coupled to the image sensor and configured to generate the first instruction and the second instruction.

Additional aspects and advantages of embodiments of present disclosure will be given in part in the following descriptions, become apparent in part from the following descriptions, or be learned from the practice of the embodiments of the present disclosure.

BRIEF DESCRIPTION OF DRAWINGS

These and other aspects and advantages of embodiments of the present disclosure will become apparent and readily appreciated from the following descriptions made with reference to the drawings.

DETAILED DESCRIPTION

Embodiments of the present disclosure are further described. Examples of the embodiments are illustrated in the accompanying drawings. Same or similar reference signs represent the same or similar components or components that have the same or similar functions from beginning to end. The embodiments described below with reference to the accompanying drawings are exemplary, are merely used to explain the present disclosure, and cannot be construed as a limitation to the present disclosure.

Figure 1:
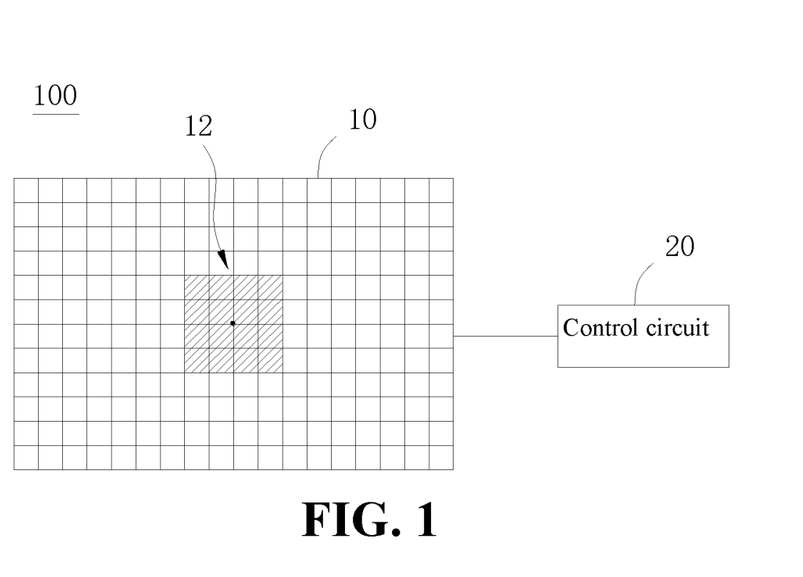
FIG. 1 is a plan view of an image sensor according to an embodiment of the present disclosure.

As illustrated in FIG. 1, an image sensor 100 according to an embodiment of the present disclosure includes a pixel array 10 and a control circuit 20. The pixel array 10 includes a plurality of pixel rows and a plurality of pixel columns. The control circuit 20 is configured to control the image sensor 100 to operate in an imaging mode or in a light sensing mode.

The control circuit 20 is further configured to receive a first instruction to control a intersection region 12 of a part of the pixel rows and a part of the pixel columns to detect an illumination intensity so that the image sensor 100 operates in the light sensing mode, and also to receive a second instruction to control the pixel array 10 to acquire an image so that the image sensor 100 operates in the imaging mode.

In the image sensor 100 according to an embodiment of the present disclosure, the same image sensor 100 has both the imaging mode and the light sensing mode, so as to avoid providing one camera element and one light sensing element at the same time in an electronic device such as a mobile phone. Thus, a space configured to arrange a display screen in the mobile phone is large, and a screen-to-body ratio of the mobile phone is high.

It can be understood that each pixel row and each pixel column includes a plurality of pixels, respectively. Each pixel can acquire an illumination intensity signal and an image signal. Therefore, when the image sensor 100 operates in the imaging mode, the pixel array 10 may acquire an external image formed on a surface of the pixel array 10. When the image sensor 100 operates in the light sensing mode, the pixel array 10 may obtain the illumination intensity of light illuminated on the pixel.

In some embodiments of the present disclosure, the control circuit 20 controls the intersection region 12 to sense light according to the first instruction. The light in a current scene reaches each pixel of the intersection region 12, and a photosensitive element corresponding to each pixel in the intersection region 12 generates a voltage change so as to acquire a pixel value corresponding to each pixel. Calculation is conducted according to a series of above pixel values, such that the illumination intensity is obtained.

The control circuit 20 controls the pixel array 10 to acquire the image according to the second instruction. The light in the current scene arrives at each pixel of the pixel array 10, and the photosensitive element corresponding to each pixel in the pixel array 10 generates a voltage change to obtain a pixel value corresponding to each pixel. According to a series of above pixel values, a final image may be obtained after interpolation, demosaicing and other processing.

It should be noted that when the image sensor 100 operates in the imaging mode, all the pixels in the pixel array 10 may be controlled to acquire an image, and of course, a part of the pixels in the pixel array 10 may be controlled to acquire the image. That is, an imaging area of the pixel array 10 may be the whole area of the pixel array 10, or a partial area of the pixel array 10.

As a light sensing area of the pixel array 10, the intersection region 12 may include a plurality of pixels, and each pixel forming the intersection region 12 corresponds to an associated pixel row and an associated pixel column. For example, one of the pixels forming the intersection region 12 corresponds to the fourth pixel row and the fourth pixel column.

The control circuit 20 may control each pixel in the pixel array 10 to operate independently so as to control the intersection region 12 to be in an operating state, while the other areas to be in a standby state.

In some embodiments of the present disclosure, one pixel row is connected to a switch, and one pixel column is connected to another switch. When the above two switches are closed at the same time, a pixel corresponding to an intersection of the pixel row and the pixel column operates.

Figure 2:
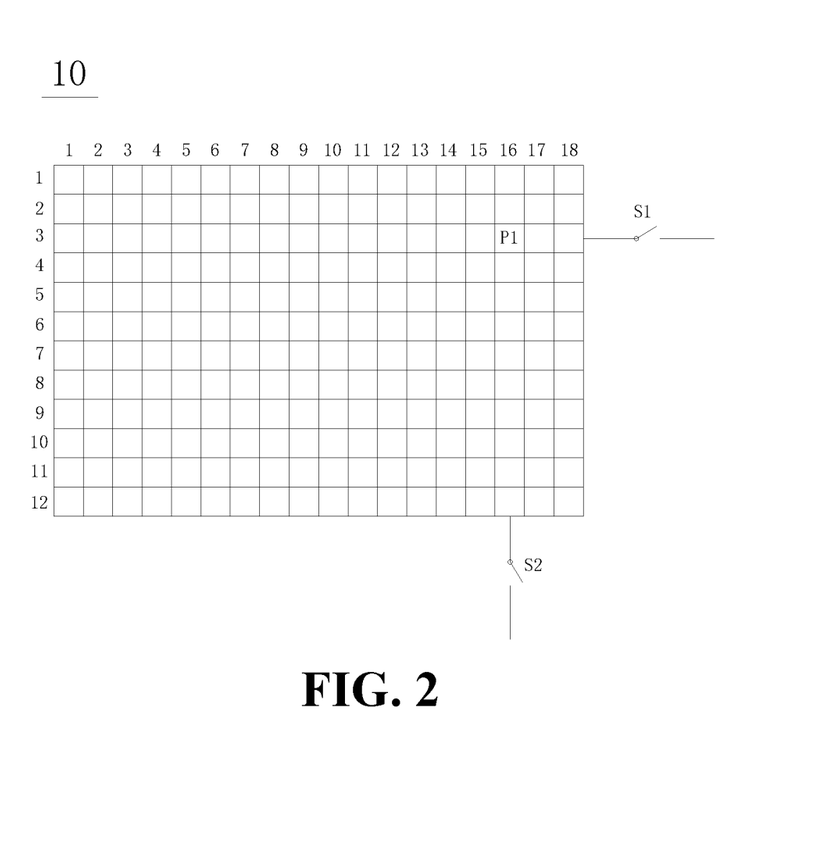
FIG. 2 is a plan view of a pixel array according to an embodiment of the present disclosure.

As illustrated in FIG. 2, an intersection of the third pixel row and the sixteenth pixel column correspond to a pixel P1. The third pixel row is connected to a first switch S1, and the sixteenth pixel column is connected to a second switch S2. When the first switch S1 and the second switch S2 are closed simultaneously, the pixel P1 operates.

Of course, in other embodiments, a single pixel may be controlled to operate in other ways. For example, each pixel is connected to a single switch, and the corresponding pixel starts to operate when the single switch is closed.

It should be pointed out that when the image sensor 100 operates in the imaging mode, the intersection region 12 may also acquire the external image.

Additionally, in some embodiments of the present disclosure, the pixel array 10 has a square shape. In other embodiments, the pixel array may have other shapes, such as a polygonal shape or a circular shape, which is not limited herein.

In some embodiments, the intersection region 12 is arranged at a center of the pixel array 10, as illustrated in FIG. 1.

In this way, the light may easily reach the intersection region 12 at the center of the pixel array 10, such that the image sensor 100 can detect the light intensity easily, and the sensitivity of the image sensor 100 detecting the light intensity is good.

Figure 3:
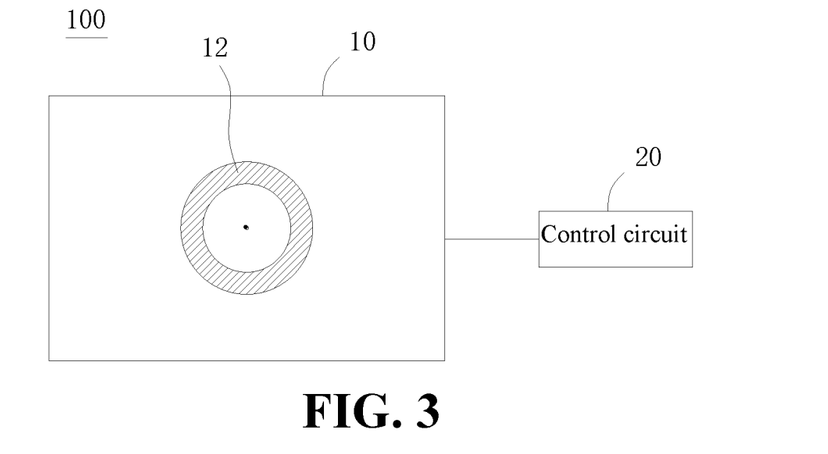
FIGS. 3-8 are plan views of an image sensor according to embodiments of the present disclosure.
Figure 4:
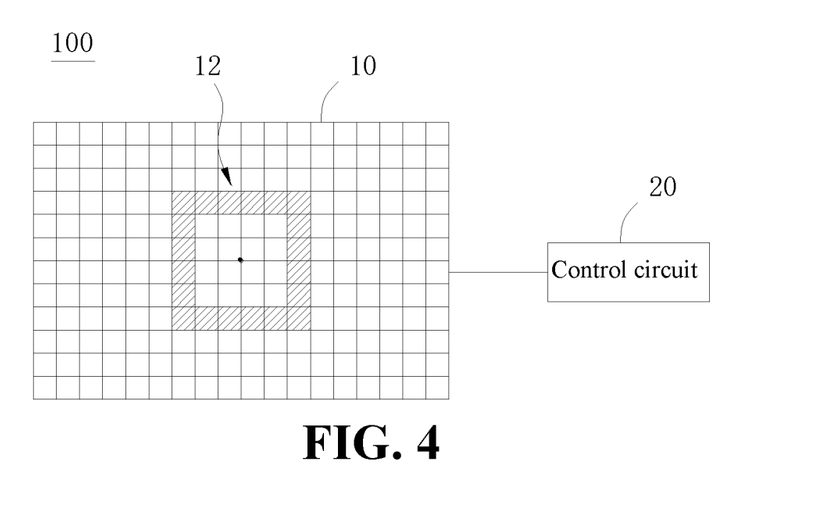

Of course, in some embodiments, the intersection region 12 is a ring-shaped intersection region 12, and the ring-shaped intersection region 12 is arranged to surround the center of the pixel array 10, as illustrated in FIGS. 3 and 4.

In some embodiments, the ring-shaped intersection region 12 has an annular ring shape, as illustrated in FIG. 3. It should be noted that since the ring-shaped intersection region 12 includes a plurality of pixels and each pixel may have a polygonal shape or a circular shape, inner and outer boundary lines of the ring-shaped intersection region 12 may be formed by a plurality of line segments connected together and have a roughly circular shape.

In some embodiments, the ring-shaped intersection region 12 may also have a square ring shape, as illustrated in FIG. 4. Of course, in other embodiments, the ring-shaped intersection region 12 may also have other shapes besides the circular ring shape and the square ring shape, such as an irregular ring shape.

In some embodiments of the present disclosure, the intersection region 12 is arranged centrosymmetrically with respect to the center of the pixel array 12. Thus, an area around the center of the pixel array 10 may detect the illumination intensity, so that the sensitivity of the image sensor 100 detecting the light intensity is improved.

In some embodiments, at least two intersection regions 12 are provided, and evenly spaced apart from one another around the center of the pixel array 10. For example, the number of the intersection regions 12 is two, three, four or five, etc. The specific number of intersection regions 12 may be set according to the actual situation, which is not limited herein. In addition, each intersection region 12 may have a circular shape, a sector shape, a polygonal shape and other shapes, which is not limited herein.

Figure 5:
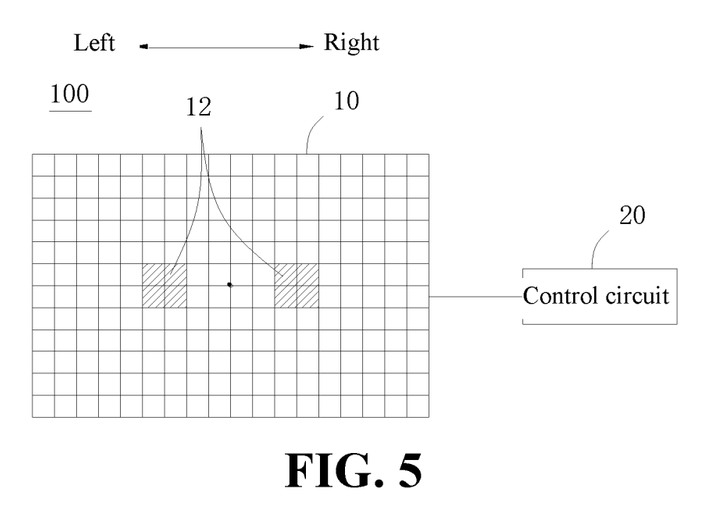

In some embodiments of the present disclosure, when the number of the intersection regions 12 is two, the two intersection regions 12 are symmetrically arranged on the left side and the right side of the center of the pixel array 10, respectively, as illustrated in FIG. 5.

Figure 10:
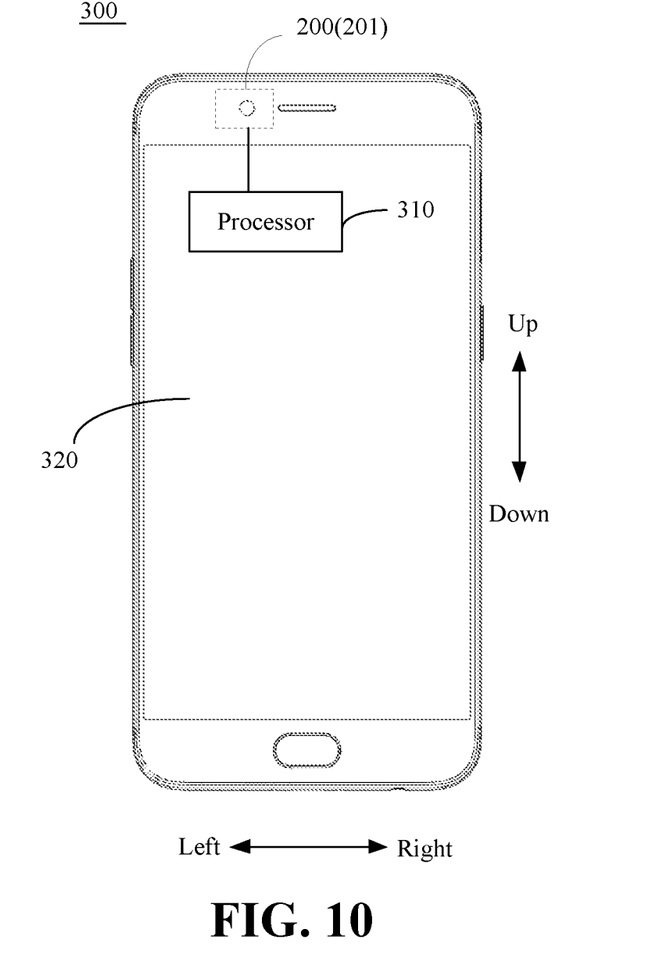
FIG. 10 is a front view of an electronic device according to an embodiment of the present disclosure.

In some embodiments of the present disclosure, when the image sensor 100 is applied to an electronic device 300 such as the mobile phone, as illustrated in FIG. 10, a left and right direction of the pixel array 10 corresponds to a transverse direction of the electronic device 300. That is, the two intersection areas 12 are arranged side by side along the transverse direction of the electronic device 300, such that when the electronic device 300 is inclined in the transverse direction, the intersection areas 12 can always detect the illumination intensity, thus improving the sensitivity of the image sensor 100 detecting the light intensity.

Figure 6:
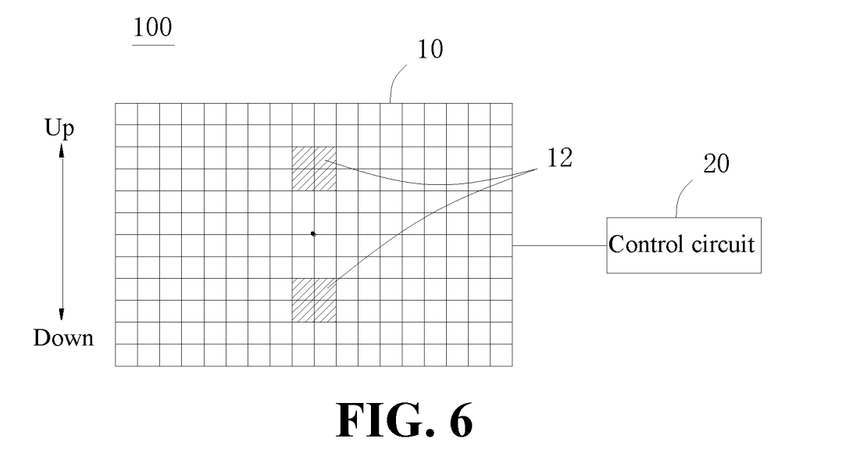

In some other embodiments of the present disclosure, when the number of the intersection regions 12 is two, the two intersection regions 12 are symmetrically arranged on the upper side and the lower side of the center of the pixel array 10, respectively, as illustrated in FIG. 6.

In some embodiments of the present disclosure, when the image sensor 100 is applied to the electronic device 300 such as the mobile phone, an upper and lower direction of the pixel array 10 corresponds to a longitudinal direction of the electronic device 300. That is, the two intersection regions 12 are arranged side by side along the longitudinal direction of the electronic device 300, so that when the electronic device 300 is inclined in the longitudinal direction, the intersection regions 12 can always detect the illumination intensity, thus improving the sensitivity of the image sensor 100 detecting the light intensity.

Figure 7:
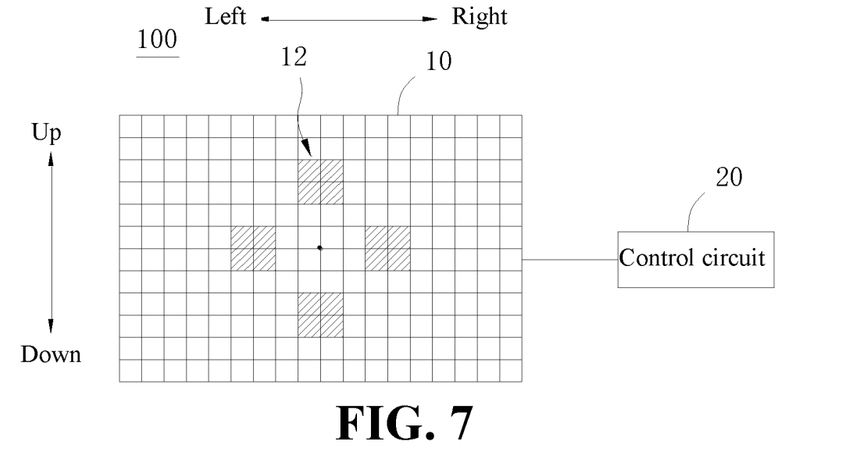

In some other embodiments of the present disclosure, when the number of the intersection regions 12 is four, two intersection regions 12 are symmetrically arranged on the left side and the right side of the center of the pixel array 10, respectively, and the other two intersection regions 12 are symmetrically arranged on the upper side and the lower side of the center of the pixel array 10, respectively, as illustrated in FIG. 7.

It should be pointed out that the above transverse direction of the electronic device 300 is, for example, the left and right direction illustrated in FIG. 10, and the above longitudinal direction of the electronic device 300 is, for example, the upper and lower direction illustrated in FIG. 10.

Figure 8:
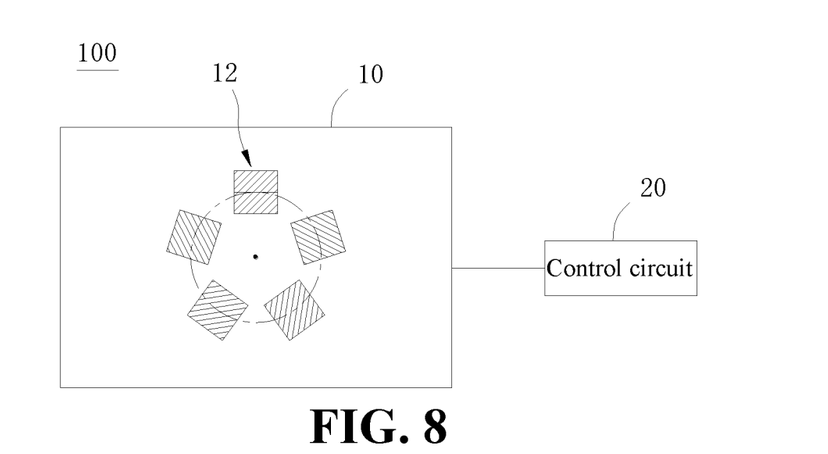

In some other embodiments of the present disclosure, when the number of the intersection regions 12 is five, the intersection regions 12 are evenly spaced apart from one another around the center of the pixel array 10. That is, an included angle defined between two adjacent intersection regions 12 and the center of the pixel array 10 is 72 degrees, as illustrated in FIG. 8. Further, a connection line between one of the two adjacent intersection regions 12 and the center of the pixel array 10 and another connection line between the other one of the two adjacent intersection regions 12 and the center of the pixel array 10 has an included angle of 72 degrees therebetween.

In some embodiments, when a plurality of the intersection regions 12 is provided, all the intersection regions 12 have equal areas.

It should be noted that when the pixel array 12 has a regular shape, the center of the pixel array 12 is a geometric center of the regular shape. In some embodiments of the present disclosure, when the pixel array 12 has a circular shape, the center of the pixel array 12 is a center of a circle. In some other embodiments of the present disclosure, when the pixel array 12 has a square shape, the center of the pixel array 12 is an intersection of diagonals of the square.

When the pixel array 12 has an irregular shape, the center of the pixel array 12 is a barycenter of the pixel array 12.

In some embodiments, a ratio of an area A1 of the intersection region 12 to an area A2 of the pixel array 10 ranges from 0.1 to 0.4, i.e. 0.1<A1/A2<0.4. In some embodiments of the present disclosure, A1/A2 is 0.15, 0.2, 0.25, 0.3 or 0.35, etc.

When A1/A2 is in the above numerical range, the pixel array 10 can reduce the number of pixels needed to operate while ensuring the detection of the illumination intensity, so as to reduce a power consumption of the image sensor 100.

Figure 9:
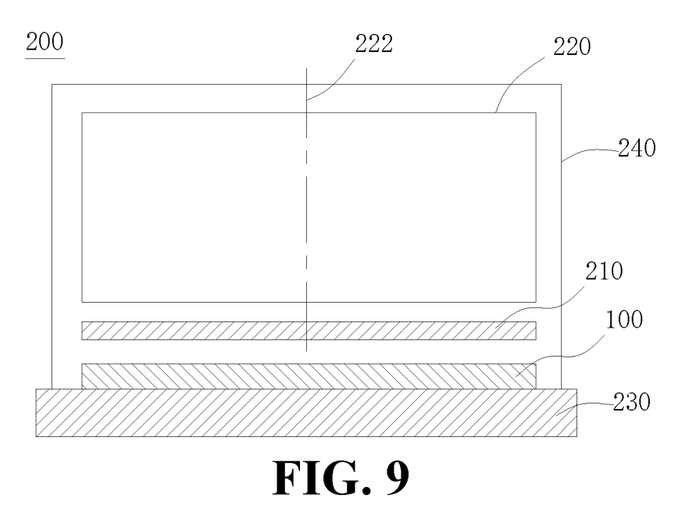
FIG. 9 is a schematic view of a camera module according to an embodiment of the present disclosure.

As illustrated in FIG. 9, a camera module 200 according to an embodiment of the present disclosure includes an image sensor 100 according to any one of the aforementioned embodiments and an optical filter 210. The optical filter 210 is arranged above the image sensor 100.

In the camera module 200 according to the embodiment of the present disclosure, since the same image sensor 100 has both the imaging mode and the light sensing mode, it is avoided that one camera element and one light sensing element are provided simultaneously in an electronic device such as a mobile phone, so that the space used for arranging the display screen in the mobile phone is large and the screen-to-body ratio of the mobile phone is high.

In some embodiments of the present disclosure, the optical filter 210 is a RGB optical filter 210, so that the image sensor 100 can obtain a good image. The RGB optical filter 210 may be arranged in a Bayer array so that light passes through the optical filter 210 and then the pixel array 10 obtains a color image.

Of course, in some embodiments, the optical filter 210 may be a visible light filter 210. Thus, after the light passes through the visible light filter 210, only a visible part of the light reaches the pixel array 10, while the light in other wavelengths is blocked. The intersection region 12 may be used to detect the illumination intensity of the visible light, and the pixel array 10 may also be used to obtain an image. Since the interference of an invisible part of the light is avoided, the accuracy of the photosensitivity monitoring and the quality of the image acquisition are improved.

In some embodiments, the camera module 200 also includes a lens 220, and the lens 220 is arranged above the optical filter 210. An optical axis 222 of the lens 220 is aligned with a center of the image sensor 100.

In this way, the light passing through the lens 220 reaches various areas of the image sensor 100 evenly, so that the imaging effect of the image sensor 100 is good and the illumination intensity can be well detected.

In some embodiments, the camera module 200 also includes a circuit board 230 and a shell 240. The image sensor 100 is arranged on the circuit board 230, and the lens 220 is arranged above the optical filter 210. The lens 220 is arranged in the shell 240 and fixedly connected to the shell 240.

As illustrated in FIG. 10, an electronic device 300 according to an embodiment of the present disclosure includes a camera module 200 according to any one of the above embodiments and a processor 310. The processor 310 is configured to generate a first instruction and a second instruction. The electronic device 300 is a device with a display screen, such as a mobile phone, a tablet computer or a smart wearable device.

In the electronic device 300 according to the embodiment of the present disclosure, since the same image sensor 100 has both the imaging mode and the light sensing mode, it is avoided that one camera element and one light sensing element are simultaneously provided in the electronic device such as the mobile phone, so that the space used for arranging the display screen in the mobile phone is large and the screen-to-body ratio of the mobile phone is high.

In some embodiments of the present disclosure, the processor 310 sends the first instruction and the second instruction to the control circuit 20. The processor 310 may generate and send the first instruction separately, or generate and send the second instruction separately. The first instruction and the second instruction may be generated when the processor 310 receives an input operation, and the input operation may be an operation input by the user or an input from an application environment.

In some embodiments of the present disclosure, the first instruction and the second instruction may be generated by the processor 310 after the processor 310 receives an operation of touching or pressing a specified function key of the electronic device 300 by the user.

In some other embodiments of the present disclosure, the first instruction and the second instruction may also be generated by the processor 310 when the system time of the mobile phone reaches a predetermined time point. The control circuit 20 may be used to receive the first instruction separately to control the intersection region 12 to detect the illumination intensity, or to receive the second instruction separately to control the pixel array 10 to acquire the image.

In some embodiments, the electronic device 300 includes a single camera module 200, and the single camera module 200 is a front camera module 201. Thus, the single camera module 200 may acquire an illumination intensity or an image of an object in front of the display screen 320 of the electronic device 300.

Figure 11:
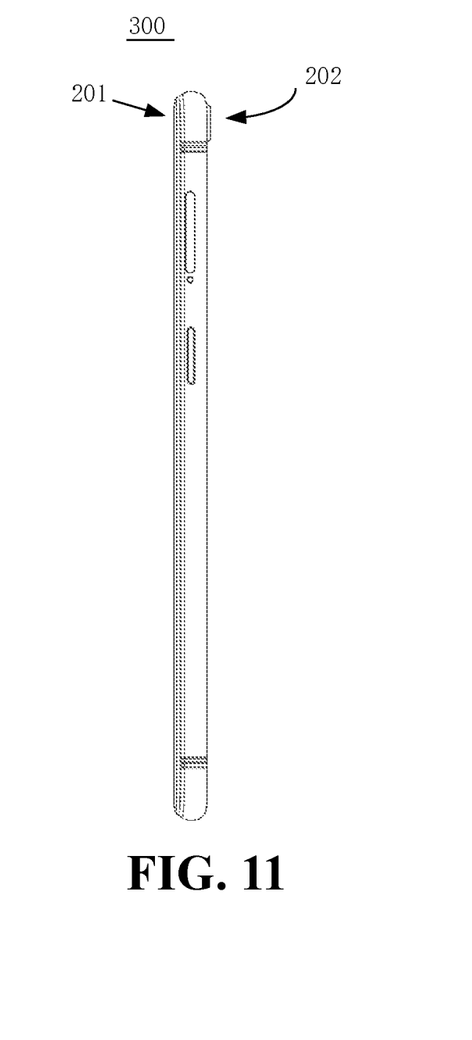
FIG. 11 is a side view of an electronic device according to an embodiment of the present disclosure.

Of course, in some embodiments, the electronic device 300 may include two camera modules 200. One camera module 200 is a front camera module 201 and the other camera module 200 is a rear camera module 202, as illustrated in FIG. 11.

The front camera module 201 may acquire an illumination intensity or an image of an object in front of the electronic device 300, while the rear camera may acquire an illumination intensity or an image of an object in rear of the electronic device 300.

The image sensor 100 in the front camera module 201 may operate in the imaging mode or the light sensing mode, and the image sensor 100 in the rear camera module 202 may also operate in the imaging mode or the light sensing mode. That is, an operation state of the electronic device 300 includes following conditions in Table 1.

TABLE 1

|  | Serial number | Image Sensor in Front Camera Module | Image Sensor in Rear Camera Module |
| --- | --- | --- | --- |
| Operation state | 1 | Imaging mode | Standby mode |
|  | 2 | Imaging mode | Imaging mode |
|  | 3 | Imaging mode | light sensing mode |
|  | 4 | light sensing mode | Standby mode |
|  | 5 | light sensing mode | Imaging mode |
|  | 6 | light sensing mode | light sensing mode |
|  | 7 | Standby mode | Imaging mode |
|  | 8 | Standby mode | light sensing mode |

It should be noted that the standby mode of the image sensor 100 means that the image sensor 100 is neither in the imaging mode nor in the light sensing mode, and the image sensor 100 cannot detect the illumination intensity and acquire the image.

In some embodiments of the present disclosure, when the processor 310 does not generate the second instruction, the image sensor 100 in the front camera module 201 and the image sensor 100 in the rear camera module 202 both operate in the light sensing mode. The electronic device 300 may simultaneously obtain the illumination intensity around the front camera module 201 and the illumination intensity around the rear camera module 202.

Taking the electronic device 300 which is the mobile phone as an example, when the user uses the electronic device 300, a large difference may exist between the illumination intensity in front of the electronic device 300 and the illumination intensity in rear of the electronic device 300. For example, the user may place the mobile phone whose front face faces downwards on a desktop. If the display brightness of the display screen 320 is controlled only according to the illumination intensity in front of the electronic device 300 detected by the front camera module 201, the display screen 320 may be in a non-display state or in a state with a very low display brightness. When the user suddenly picks up the electronic device 300 and uses it again, the electronic device 300 needs to rewake up the display screen 320 or turn the brightness of the display screen 320 up in a short time. When the user frequently picks it up and drops it down, the electronic device 300 consumes much electric energy to control the switching operation of the brightness of the display screen 320.

The electronic device 300 according to the embodiment of the present disclosure can detect the illumination intensity in front of the electronic device 300 and the illumination intensity in rear of the electronic device 300 at the same time. When the user places the mobile phone whose front face faces downwards on the desktop, the display screen 320 can display with the brightness corresponding to the illumination intensity in rear of the electronic device 300 within a certain time range, and when the user re-picks up the electronic device 300 and uses it, the display brightness of the display screen 320 does not need to switch, which facilitates the usage and saves the electric energy.

In some embodiments of the present disclosure, the electronic device 300 may control the display brightness of the display screen 320 according to the larger one between the illumination intensity in front of the electronic device 300 and the illumination intensity in rear of the electronic device 300. For example, when the user lies down indoors and operates the electronic device 300, the rear camera module 202 may face towards a ceiling light source (such as a chandelier), such that the illumination intensity in rear of the electronic device 300 is larger than the illumination intensity in front of the electronic device 300. In this case, the electronic device 300 can adjust the display brightness of the display screen 320 according to the illumination intensity in rear of the electronic device 300, which facilitates the user to see the displayed content clearly and relieve the eye fatigue.

In some embodiments of the present disclosure, for the image sensor 100 of the front camera module 201 and the image sensor 100 of the rear camera module 202, when one image sensor 100 operates in the imaging mode, the other image sensor 100 operates in the light sensing mode.

That is, when the image sensor 100 of the front camera module 201 operates in the imaging mode, the image sensor 100 of the rear camera module 202 operates in the light sensing mode; or, when the image sensor 100 of the front camera module 201 operates in the light sensing mode, the image sensor 100 of the rear camera module 202 operates in the imaging mode.

In this way, the processor 310 may control the image sensor 100 operating in the imaging mode to take photos according to the illumination intensity detected by the image sensor 100 operating in the light sensing mode, so as to obtain images of good quality. For example, when the illumination intensity detected by the image sensor 100 operating in the light sensing mode is weak, the processor 310 may control the image sensor 100 operating in the imaging mode to increase the exposure time so as to obtain an image of good brightness.

It can be understood that the electronic device 300 also includes components such as a battery, a power supply circuit and a memorizer. The battery is used to power the electronic device 300. The power supply circuit is connected with the battery and used to supply electric power for the electronic device 300. The memorizer is used to store data information, such as program code segments.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, "a plurality of" means two or more than two, unless specified otherwise.

In the present disclosure, it should be noted, unless specified or limited otherwise, the terms "mounted," "connected," "coupled" or the like are used broadly. The terms may indicate, for example, fixed connections, detachable connections, or integral connections, may also indicate mechanical or electrical connections or mutual communication, may also indicate direct connections or indirect connections via intermediate mediums, and may also indicate inner communications of two elements or the interaction between two elements. The specific meanings of the terms in embodiments of the present disclosure may be understood by those skilled in the art according to particular circumstances.

Various embodiments and examples are provided in the above description to implement different structures of the present disclosure. In order to simplify the present disclosure, certain elements and settings have been described. However, these elements and settings are only by way of example and are not intended to limit the present disclosure. In addition, reference numerals and/or letters may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Reference throughout this specification to terms "an embodiment," "some embodiments," "an example", "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Moreover, the particular features, structures, materials, or characteristics described may be combined in any suitable manner in one or more embodiments or examples. Furthermore, in the case of non-contradiction, those skilled in the art may combine and group the different embodiments or examples described in this specification and the features of the different embodiments or examples.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means at least two, such as two, three and so on, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the implementations may not be in the order illustrated or discussed. For example, functions are performed in a substantially simultaneous manner or in a reverse order according to the functions involved, which should be understood by those skilled in the art of embodiments of the present disclosure.

The logic and/or step described in other manners herein or illustrated in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although embodiments of the present disclosure have been illustrated and described above, it should be understood that the above embodiments are illustrative and cannot be construed to limit the present disclosure, and that those skilled in the art may change, modify, alternate and vary the above embodiments within the scope of the present disclosure.

The invention claimed is:

1. An image sensor, comprising:
  a pixel array comprising a plurality of pixel rows and a plurality of pixel columns; and a control circuit configured to:
    receive a first instruction to control an intersection region of a part of the plurality of pixel rows and a part of the plurality of pixel columns to detect a illumination intensity; and
    receive a second instruction to control at least part of the pixel array to acquire an image,
    wherein the intersection region is a ring-shaped intersection region, and the ring-shaped intersection region is arranged to surround a center of the pixel array,
    wherein the ring-shaped intersection region is centrosymmetrically arranged with respect to the center of the pixel array, and
    wherein a ratio of an area of the intersection region to an area of the pixel array ranges from 0.1 to 0.2 or from 0.3 to 0.4.

2. The image sensor according to claim 1, wherein each pixel row comprises a plurality of pixels, and each pixel column comprises a plurality of pixels,
    the part of the plurality of pixel rows each is connected to a first switch and the part of the plurality of pixel columns each is connected to a second switch,
    the first switch is configured to turn on or off the plurality of pixels in each of the part of the plurality of pixel rows, and the second switch is configured to turn on or off the plurality of pixels in each of the part of the plurality of pixel columns.

3. The image sensor according to claim 1, wherein the intersection region is a ring-shaped intersection region and the ring-shaped intersection region is arranged to surround a center of the pixel array.

4. The image sensor according to claim 3, wherein the ring-shaped intersection region has a square ring shape.

5. The image sensor according to claim 3, wherein the ring-shaped intersection region is centrosymmetrically arranged with respect to the center of the pixel array.

6. The image sensor according to claim 1, wherein the ring-shaped intersection region has a circular ring shape.

7. The image sensor according to claim 1, wherein at least two intersection regions are provided, and evenly spaced apart from one another around a center of the pixel array.

8. The image sensor according to claim 7, wherein the at least two intersection regions have equal areas.

9. The image sensor according to claim 1, wherein the intersection region is arranged at a center of the pixel array.

10. A camera module, comprising:
    an image sensor; and
    an optical filter arranged above the image sensor,
    wherein the image sensor comprises:
    a pixel array comprising a plurality of pixel rows and a plurality of pixel columns; and
    a control circuit configured to:
        receive a first instruction to control an intersection region of a part of the pixel rows and a part of the pixel columns to detect a illumination intensity, so as to control the image sensor to operate in a light sensing mode; and
        receive a second instruction to control the pixel array to acquire an image, so as to control the image sensor to operate in an imaging mode,
    wherein the intersection region is a ring-shaped intersection region and the ring-shaped intersection region is arranged to surround a center of the pixel array,
    wherein the ring-shaped intersection region is centrosymmetrically arranged with respect to the center of the pixel array, and
    wherein a ratio of an area of the intersection region to an area of the pixel array ranges from 0.1 to 0.2 or from 0.3 to 0.4.

11. The camera module according to claim 10, further comprising a lens arranged above the optical filter, and the lens having an optical axis aligned with a center of the image sensor.

12. The camera module according to claim 11, further comprising a circuit board and a shell connected to the circuit board, wherein the image sensor is arranged on the circuit board, and the lens is received in the shell and connected to the shell.

13. The camera module according to claim 10, wherein the optical filter is a RGB optical filter.

14. The camera module according to claim 10, wherein the optical filter is a visible light filter.

15. An electronic device, comprising:
    a camera module comprising:
        an image sensor comprising:
            a pixel array comprising a plurality of pixel rows and a plurality of pixel columns; and
            a control circuit configured to:
                receive a first instruction to control an intersection region of a part of the plurality of pixel rows and a part of the plurality of pixel columns to detect a illumination intensity; and
                receive a second instruction to control at least part of the pixel array to acquire an image; and
        an optical filter arranged above the image sensor; and
    a processor coupled to the image sensor and configured to generate the first instruction and the second instruction,
    wherein the intersection region is a ring-shaped intersection region and the ring-shaped intersection region is arranged to surround a center of the pixel array,
    wherein the ring-shaped intersection region is centrosymmetrically arranged with respect to the center of the pixel array, and
    wherein a ratio of an area of the intersection region to an area of the pixel array ranges from 0.1 to 0.2 or from 0.3 to 0.4.

16. The electronic device according to claim 15, wherein two camera modules are provided, and one of the two camera modules is a front camera module, and the other one of the two camera modules is a rear camera module.

17. The electronic device according to claim 16, wherein the image sensor is configured to operate in a light sensing mode when the control circuit controls the intersection region to detect the illumination intensity, and to operate in an imaging mode when the control circuit controls the at least part of the pixel array to acquire the image.

18. The electronic device according to claim 17, wherein one of the image sensor of the front camera module and the image sensor of the rear camera module operates in the imaging mode, and the other one of the image sensor of the front camera module and the image sensor of the rear camera module operates in the light sensing mode.

19. The electronic device according to claim 17, wherein the image sensor in the front camera module and the image sensor in the rear camera module both are configured to operate in the light sensing mode when the processor does not generate the second instruction.

* * * * *